United States Patent Office.

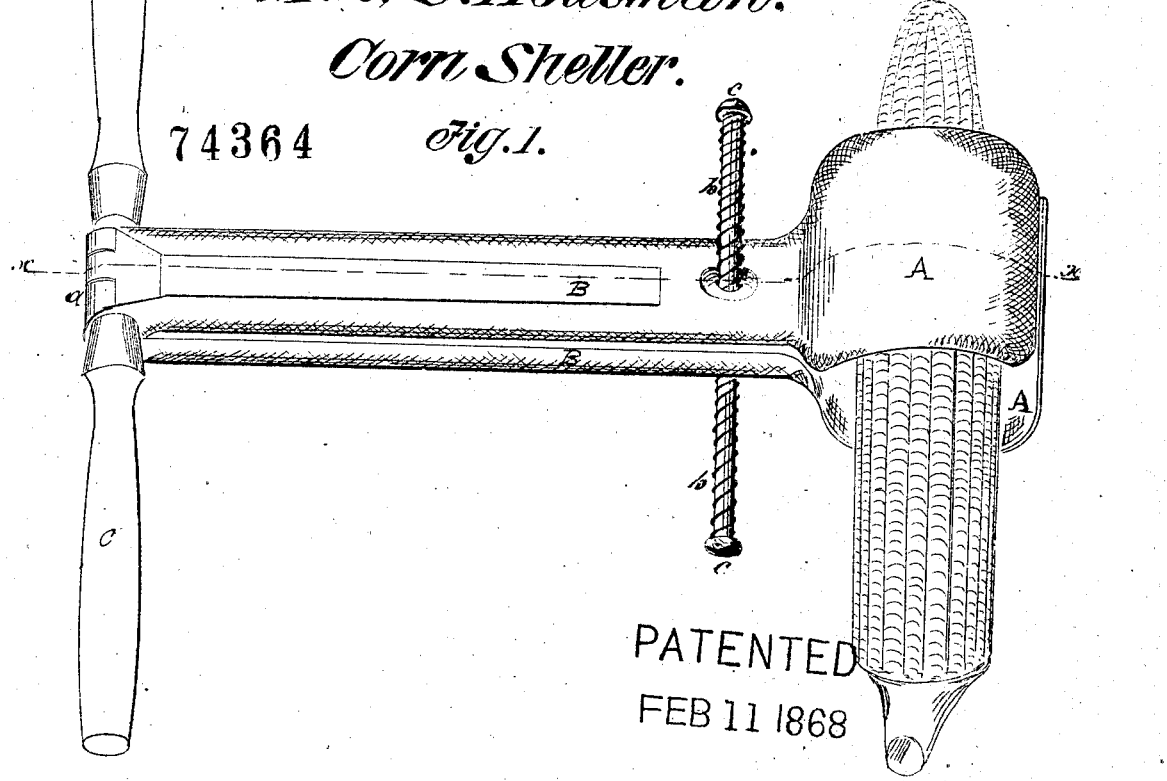
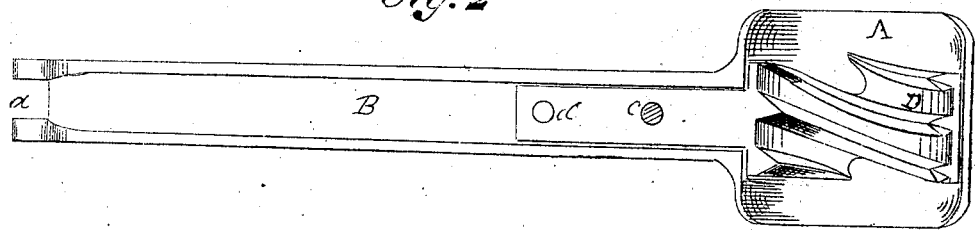
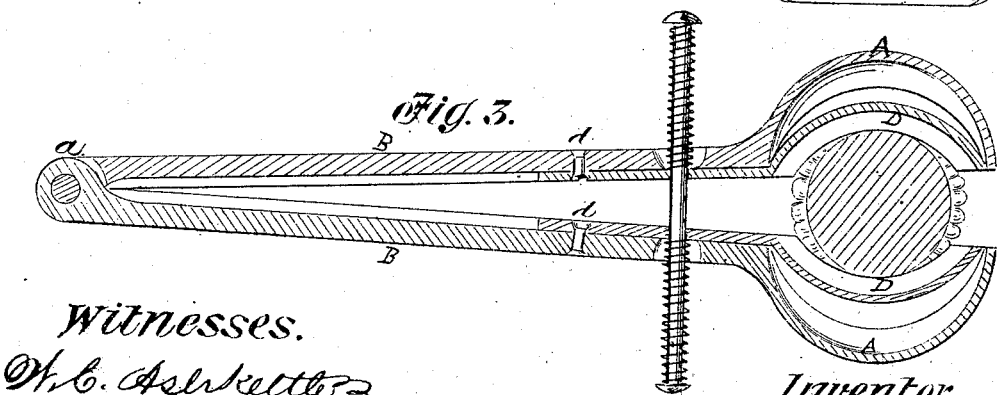

MICHAEL HOUSMAN AND SIMEON HOUSMAN, OF HUNTINGTON, INDIANA.

*Letters Patent No. 74,364, dated February 11, 1868.*

---

IMPROVEMENT IN CORN-SHELLERS.

---

The Schedule referred to in these Letters Patent and making part of the same.

---

TO ALL WHOM IT MAY CONCERN:

Be it known that we, MICHAEL HOUSMAN and SIMEON HOUSMAN, of Huntington, in the county of Huntington, and State of Indiana, have invented a new and useful Improvement in Corn-Shellers; and we do hereby declare that the following is a full, clear, and exact description thereof, which will enable others skilled in the art to make and use the same, reference being had to the accompanying drawings, forming part of this specification, in which—

Figure 1 represents a side view of our improved corn-sheller.

Figure 2 represents an inside view of one of the sides.

Figure 3 is a longitudinal section of the corn-sheller, taken in the line $x\ x$, fig. 1.

Similar letters of reference indicate corresponding parts.

This invention relates to an improvement in a corn-sheller, for which Letters Patent, No. 29,886, were granted to MICHAEL HOUSMAN, September 4, 1860, and No. 60,375, to MICHAEL HOUSMAN and SIMEON HOUSMAN, December 11, 1866; and the present improvement consists in surrounding the claw projections or clamps of the corn-sheller with a shell or shield, for the purpose of preventing the grains of corn from scattering, and to protect the hand of the operator from injury by contact with the sharp edges of the claw-threads.

The general construction and operation of the instrument are the same as described in the patents previously granted, the improvement of the present invention being the metal shields A A, forming the extremities of the jaws B B, that are attached to the handle C by a hinge-joint, $a$, as usual, and operated by the spiral springs $b\ b$, coiled around the pin $c$, that passes through the jaws B B. The shields A A partly enclose or surround the flange projections or screw-threaded claws D D, that are formed as in the old patents aforesaid, for shelling the corn by passing the ear between them, and the shields catch the grains of corn as they are shelled, which prevents their scattering, while also the hand of the operator is prevented from coming in contact with the points of the claws D D. The claws D D are fastened on the inside of the jaws B B with rivets $d\ d$.

Having thus described our invention, what we claim as new, and desire to secure by Letters Patent, is—

The shields A A, in combination with the jaws B B and the claws D D, constructed and operating substantially as and for the purpose herein described.

The above specification of our invention signed by us, this 12th day of December, 1867.

MICHAEL HOUSMAN,
          SIMEON HOUSMAN.

Witnesses:
  W. F. ODER,
  E. B. AYRES.